United States Patent
Yeom et al.

(10) Patent No.: US 8,690,348 B2
(45) Date of Patent: Apr. 8, 2014

(54) SYSTEM FOR ADJUSTING IMAGE OF BEAM PROJECTOR USING CAMERA ATTACHED REMOTE CONTROLLER AND METHOD THEREOF

(75) Inventors: Jeong Nam Yeom, Jeollanam-do (KR); Sung Hoon Kim, Daejeon (KR); Joon Myun Cho, Daejeon (KR); Joo Chan Sohn, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 119 days.

(21) Appl. No.: 13/293,487

(22) Filed: Nov. 10, 2011

(65) Prior Publication Data
US 2012/0113399 A1 May 10, 2012

(30) Foreign Application Priority Data
Nov. 10, 2010 (KR) .................. 10-2010-0111790

(51) Int. Cl.
*G03B 21/14* (2006.01)
(52) U.S. Cl.
USPC ............... 353/69; 353/30; 353/42; 353/70; 353/85; 348/746; 348/747
(58) Field of Classification Search
USPC ............ 353/30, 31, 42, 46, 69–70, 85, 121; 348/333.1, 745–747, E5.045, E5.137; 349/5, 7–9; 362/552, 551, 558, 581
See application file for complete search history.

(56) References Cited

U.S. PATENT DOCUMENTS

| 6,538,705 | B1 * | 3/2003 | Higurashi et al. | 348/745 |
| 7,929,758 | B2 * | 4/2011 | Cho et al. | 382/167 |
| 2005/0231691 | A1 * | 10/2005 | Li | 353/69 |
| 2007/0206159 | A1 * | 9/2007 | Itaki | 353/69 |
| 2008/0252860 | A1 * | 10/2008 | Matsumoto et al. | 353/70 |
| 2008/0284987 | A1 * | 11/2008 | Yonezawa | 353/70 |

FOREIGN PATENT DOCUMENTS

KR      2003-0090088      11/2003

\* cited by examiner

*Primary Examiner* — Georgia Epps
*Assistant Examiner* — Sultan Chowdhury
(74) *Attorney, Agent, or Firm* — Nelson Mullins Riley & Scarborough LLP; Anthony A. Laurentano, Esq.

(57) ABSTRACT

Provided is a system for adjusting an image of a beam projector using a camera attached remote controller and a method thereof. The system for adjusting images of a beam projector according to the present invention includes: a remote controller photographing test images projected on a screen and detecting pattern images from the photographed test images and generating control information including at least one parameter necessary to adjust the images through the detected pattern images; and a beam projector receiving the control information for adjusting images from the remote controller and adjusting the input image by using parameters included in the received control information and outputting them to the screen. Therefore, the present invention adjusts colors and geometrical shapes of images at a user's viewpoint, thereby making it possible to improve the satisfaction of user and implement the system in various forms.

17 Claims, 7 Drawing Sheets

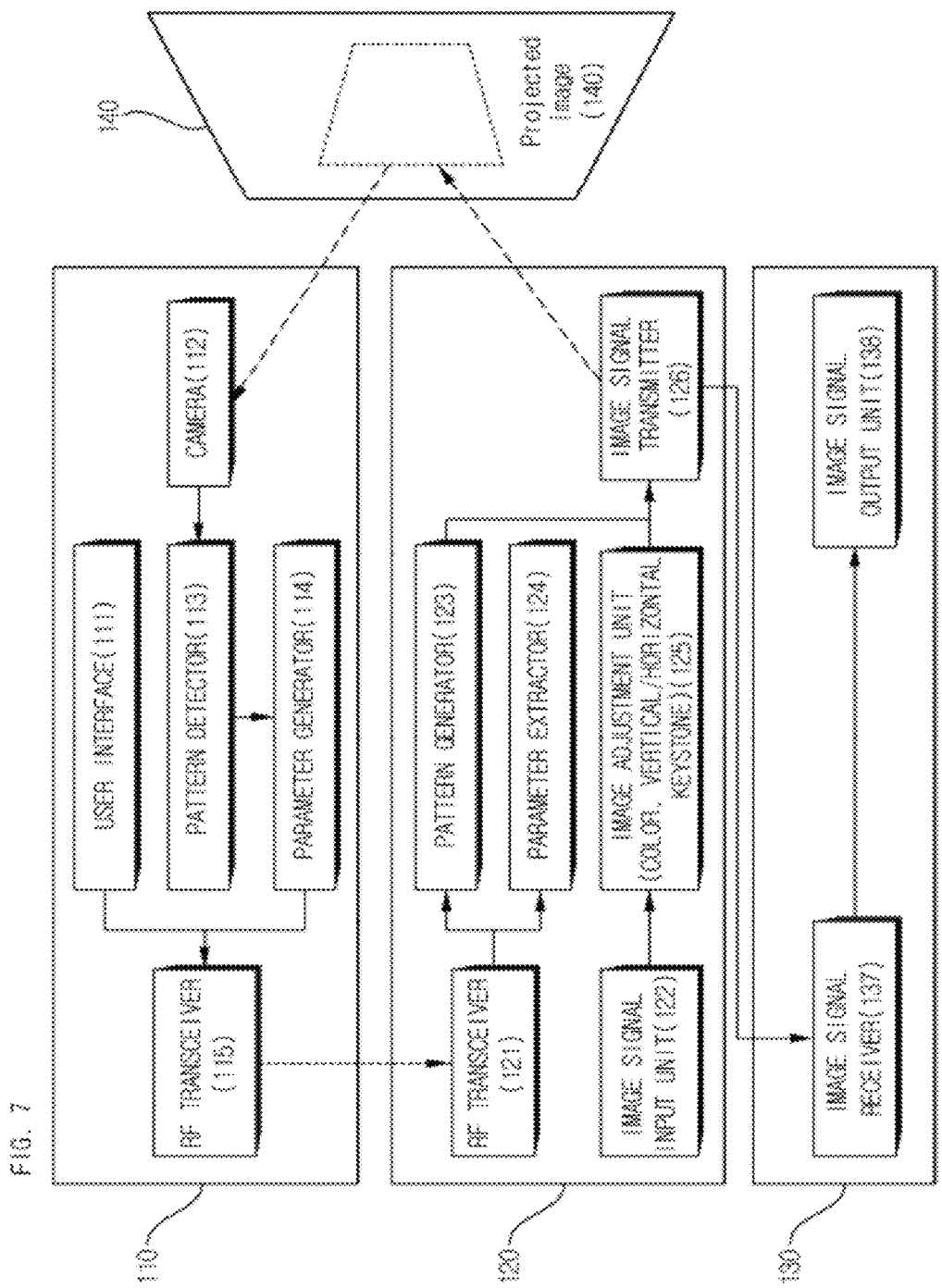

SYSTEM FOR ADJUSTING IMAGE OF BEAM PROJECTOR USING CAMERA ATTACHED REMOTE CONTROLLER AND METHOD THEREOF

CROSS-REFERENCE TO RELATED APPLICATIONS

This application claims priority to and the benefit of Korean Patent Application No. 10-2010-0111790 filed in the Korean Intellectual Property Office on Nov. 10, 2010, the entire contents of which are incorporated herein by reference.

BACKGROUND OF THE INVENTION

1. Field of the Invention

The present invention relates to a beam projector, and more particularly, to a system for adjusting images of a beam projector capable of adjusting colors and geometrical shapes of images at a user's viewpoint by photographing images projected on a screen using a camera attached remote controller and extracting specific patterns from the photographed images to generate information necessary to adjust the images, and a method thereof.

2. Description of the Related Art

Generally, a beam projector means an apparatus that realizes images on a display device, transmits light generated from a separate light source to a display device, and projects it on a screen to provide images. The light transmitting a display device in the beam projector can be magnified through a lens assembly and the focus can also be adjusted according to a distance from the screen.

Since the beam projector is expensive, it has been mainly used for meetings, presentations, rallies, events, or the like, in public places such as a large conference room, not for general users, but a beam projector for use at home has been recently commercialized. Further, owing to the development of information devices such as portable terminals, etc., an attempt to commercialize a beam projector with excellent portability, which can be stored in a user's pocket or bag without difficulty, has been made.

However, the beam projector greatly distorts colors and geometrical shapes of images according to an angle of the images projected on a screen or a wall surface. In order to adjust the problem, the user directly changes some of the parameters of the beam projector to modify color or keystone adjustment values. However, when the projector is used, it causes the inconvenience in changing the parameters whenever the beam projector is installed.

In order to improve the inconvenience, technologies of installing a camera on the projector and outputting specific patterns using the camera to adjust a focus of a lens or colors and mounting an accelerometer in the projector to adjust a vertical keystone based on a vertical slope of the projector have been currently used.

However, since the camera installed in the projector faces the projection direction of the projector, there is a limitation in detecting distorted images to adjust their geometrical shapes even though images are distorted at the user's viewpoint.

In addition, a technology of using the difference between a viewing angle of the camera and a projection angle of the projector may be considered. However, this adjusting method should also use a high-resolution camera in order to improve the precision. Further, when the projection angle is changed by using a zoom lens, this adjusting method additionally requires a separate device for recognizing the changed projection angle and thus, causes an increase in cost.

SUMMARY OF THE INVENTION

The present invention has been made in an effort to provide a system for adjusting images of a beam projector using a camera attached remote controller in order to photograph test images projected on a screen using a camera attached remote controller to extract specific pattern images and generate control information necessary for adjusting images through the extracted pattern images, and a method thereof.

An exemplary embodiment of the present invention provides a system for adjusting images of a beam projector, including: a remote controller photographing test images projected on a screen and detecting pattern images from the photographed test images and generating control information including at least one parameter necessary to adjust the images through the detected pattern images; and a beam projector receiving the control information for adjusting images from the remote controller and adjusting the input image by using parameters included in the received control information and outputting them to the screen.

The remote controller may include: a camera mounted at a predetermined position and photographing the test images projected on the screen; a pattern detector detecting pattern images from the photographed test images; a parameter generator generating at least one parameter for adjusting images from the detected pattern images; and an RF transceiver transmitting the control information including the generated parameters to the beam projector.

The remote controller may photograph the first test images projected on the screen and detect the first pattern image from the photographed first test image and generate the first parameter for adjusting the colors of the input image through the detected first pattern images, and photograph the second test images projected on the screen and detect the second pattern image from the photographed second test image and generate the second parameter for adjusting the geometrical shapes of the input image through the detected second pattern images.

The first test image may represent the images covered with white and the first pattern image may represent the images photographed to confirm the white balance and the color uniformity of the first test image.

The second test image may represent the image including the predetermined shape of blocks and the second pattern image may represent the images photographed to confirm the geometrical shapes of the second test images.

The beam projector may include: an RF transceiver receiving the control information from the remote controller; a parameter extractor extracting at least one parameter included in the received control information; an image adjustment unit adjusting the input image by using the extracted parameters; and an image signal output unit outputting the adjusted input image to the screen.

The beam projector may further include a pattern generator generating the test images when the image adjustment function is performed according to the request of the user.

Another exemplary embodiment of the present invention provides a system for adjusting an image of a beam projector, including: a remote controller photographing test images projected on a screen and detecting pattern images from the photographed test images and generating control information including at least one parameter necessary to adjust the images through the detected pattern images; an image transducer receiving the control information for adjusting images from the remote controller and adjusting the input image by using parameters included in the received control information; and a beam projector receiving the input images adjusted from the image transducer and outputting the adjuted input images to the screen.

The image transducer may include: an RF transceiver receiving the control information from the remote controller; a parameter extractor extracting at least one parameter included in the received control information; an image adjustment unit adjusting the input image by using the extracted parameters; and an image signal transmitter transmitting the adjusted input image to the beam projector.

The beam projector may include: an image signal receiver receiving the input images adjusted from the image transducer; and an image signal output unit outputting the adjusted input image to the screen.

Yet another exemplary embodiment of the present invention provides a method for adjusting an image of a beam projector in a camera attached remote controller capable of controlling various functions of the beam projector, including: photographing test images projected on the screen and detecting pattern images from the photographed test images; generating control information including at least one parameter necessary to adjust images through the detected pattern images; and transmitting the generated control information to the beam projector.

The photographing may include: photographing a first test image projected on the screen and detecting a first pattern image from the photographed first test image; and photographing a second test image projected on the screen and detecting a second pattern image from the photographed second test image.

The generating may include: generating a first parameter for adjusting colors of the input image through the detected first pattern image; and generating a second parameter for adjusting the geometrical shape of the input image through the detected second pattern image.

The first test image may represent the images covered with white and the first pattern image may represent the images photographed to confirm the white balance and the color uniformity of the first test image.

The second test image may represent the image including the predetermined shape of blocks and the second pattern image may represent the images photographed to confirm the geometrical shapes of the second test images.

Still another exemplary embodiment of the present invention provides a method for adjusting images in a beam projector requested to perform an image adjustment function from a camera attached remote controller, including: receiving control information from the remote controller; extracting at least one parameter included in the received control information; adjusting the input images using at least one of the extracted parameters; and projecting the adjusted input images on the screen.

The method for adjusting images in a beam projector may further include: generating test images when the image adjustment function is performed according to the request of the user; and projecting the generated test images on the screen.

As set forth above, the present invention can adjust colors and geometrical shapes or distortions of the images at the user's viewpoint by photographing the test images projected on a screen using the camera attached remote controller to extract the specific pattern images and generating the control information necessary for adjusting the images through the extracted pattern images.

Further, the present invention can implement the projector in various shapes by photographing the test images projected on the screen using the camera attached remote controller to extract the specific pattern images and generating the control information necessary for adjusting the images through the extracted pattern images.

In addition, the present invention can improve the satisfaction due to the image adjustment at the user's viewpoint by photographing the test images projected on the screen using the camera attached remote controller to extract the specific pattern images and generating the control information necessary for adjusting the images through the extracted pattern images.

BRIEF DESCRIPTION OF THE DRAWINGS

FIG. 7 is a second exemplified diagram showing a system for adjusting an image of a beam projector according to the exemplary embodiment of the present invention.

DETAILED DESCRIPTION OF THE EMBODIMENTS

Hereinafter, a system and method for adjusting images of a beam projector using a camera attached remote controller according to an exemplary embodiment of the present invention will be described with reference to FIGS. 1 to 7.

In particular, the present invention provides a method capable of adjusting the distortions of colors and geometrical shapes of images at the user's viewpoint by photographing the test images projected on a screen using a camera attached remote controller to extract the specific pattern images and generating the control information necessary for adjusting the images through the extracted pattern images.

Figure 1:
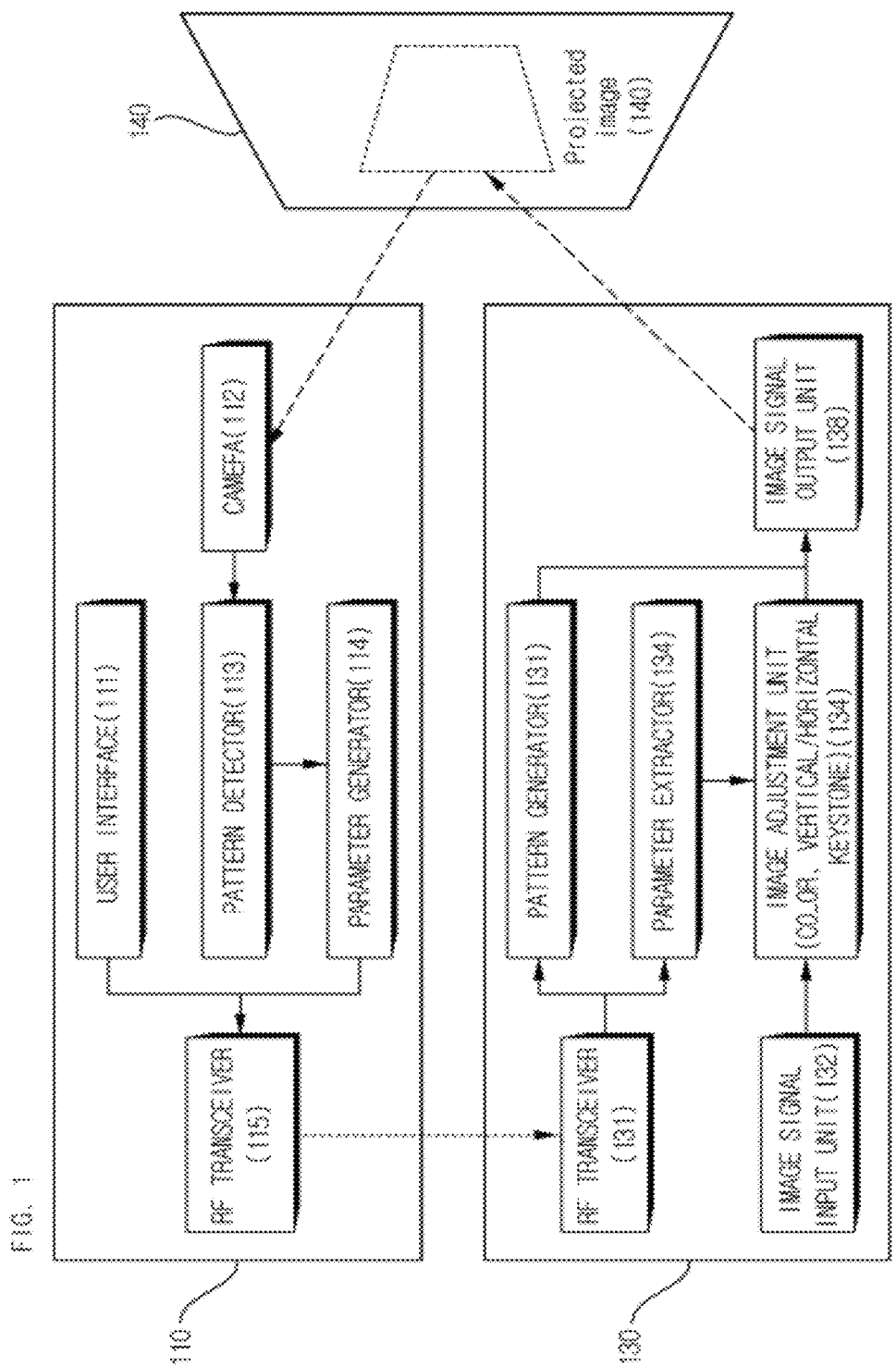
FIG. 1 is a first exemplified diagram showing a system for adjusting an image of a beam projector according to an exemplary embodiment of the present invention.

FIG. 1 is a first exemplified diagram showing a system for adjusting an image of a beam projector according to an exemplary embodiment of the present invention.

As shown in FIG. 1, a system for adjusting an image of a beam projector according to the present invention may be configured to include a remote controller 110, a beam projector 130, a screen 140, or the like.

The remote controller 110 photographs images projected on a screen using a camera and extracts specific patterns from the photographed images and generates control information necessary to adjust images through the extracted specific patterns. The remote controller may be configured to include a user interface 111, a camera 112, a pattern detector 113, a parameter generator 114, an RF transceiver 115, or the like.

The user interface 111 may include menus or buttons, etc., capable of receiving instructions for controlling various functions of the beam projector 130 from the user.

The camera 112 is mounted at a predetermined position of remote controller 110, thereby making it possible to photograph images projected on the screen.

The pattern detector 113 can detect the specific patterns necessary for adjusting images from the photographed images. When a first test image is projected on the screen from the projector according to the image adjustment, the pattern detector 113 photographs the projected first test image, thereby making it possible to detect the first pattern image. In this case, the first test image represents a white image, and the first pattern image represents an image photographed to confirm white balance, color uniformity of the projected image, or the like.

Figure 2:
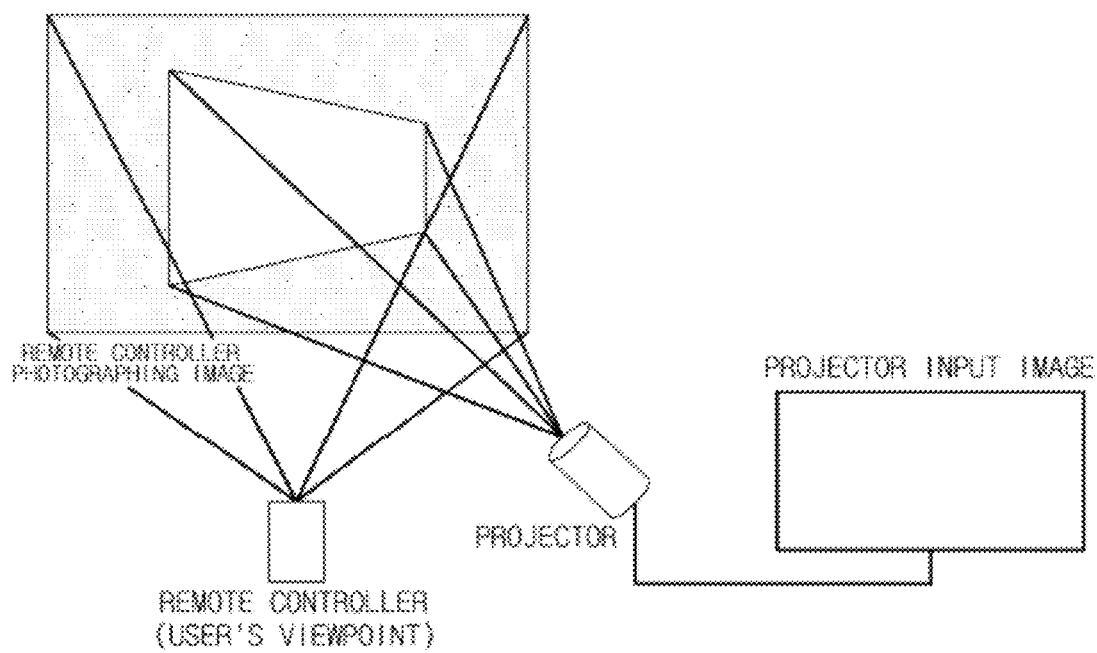
FIG. 2 is an exemplified diagram for explaining a principle of detecting a first pattern according to the exemplary embodiment of the present invention.

FIG. 2 is an exemplified diagram for explaining a principle of detecting a first pattern according to the exemplary embodiment of the present invention.

As shown in FIG. 2, the white uniformity of the image projected on the screen or the wall surface can be varied according to the position and the irradiated angle of the beam projector according to the present invention. Further, when the screen is not simple white or achromatic color, the color of the projected image may be distorted, which should be adjusted.

Therefore, the first test image may use the simple white image covered with white.

When the detection of the first pattern image is completed and a second test image is projected on the screen from the projector, the pattern detector 113 photographs the projected second test image, thereby making it possible to detect the second pattern image. In this case, the second test image represents images including a predetermined shape of blocks and the second pattern image represents the images photographed to confirm the geometrical distortions.

Figure 3:
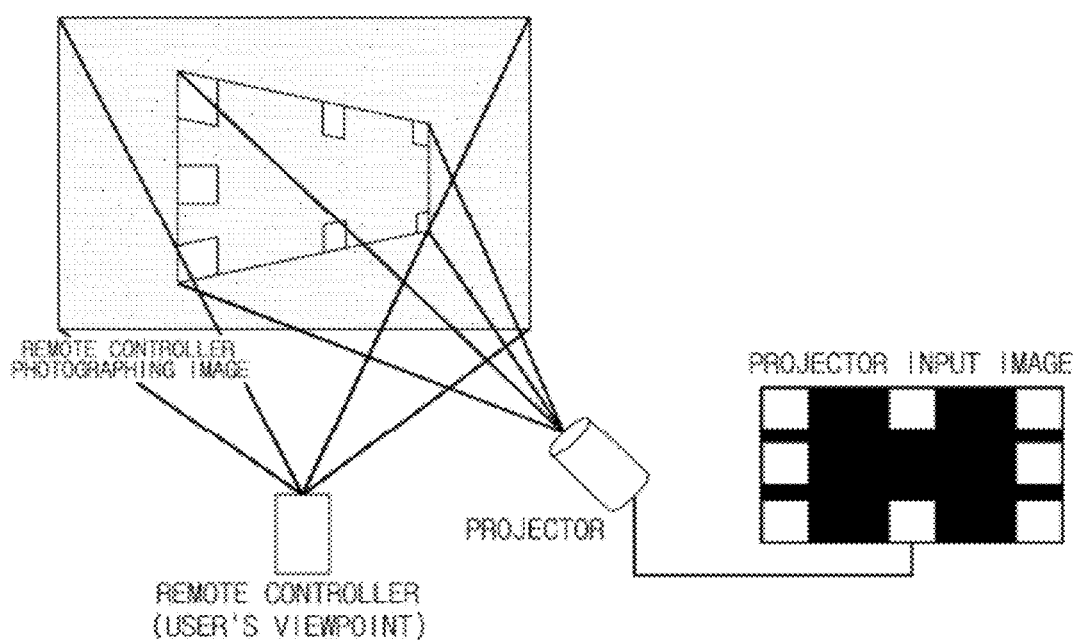
FIG. 3 is an exemplified diagram for explaining a principle of detecting a second pattern according to the exemplary embodiment of the present invention.

FIG. 3 is an exemplified diagram for explaining a principle of detecting a second pattern according to the exemplary embodiment of the present invention.

As shown in FIG. 3, four vertices are found in order to form a warping matrix for adjusting the geometrical distortions of the image projected on the screen according to the present invention. To this end, the second test image in which the predetermined shape of white blocks is arranged at the vertices of the image is used.

In the second test image, a block may be further added at points other than vertices as an assisting unit for adjusting a distance.

Further, this may be used to set a region of interest (ROI) in the first pattern image.

The parameter generator 114 may generate a first parameter for adjusting colors using the first pattern image and generate a second parameter for adjusting a geometrical shape using a second pattern image. In this case, the first parameter includes a white balance adjusting value, a color uniformity gradient map, etc., and the second parameter may include the position values of images, etc.

In particular, it is preferable to use the position values of the vertices of images as the position values of images.

The RF transceiver 115 transmits and receives the first parameter and the second parameter generated in the parameter generator 114 to the beam projector 130 through wireless communication, etc. In this case, the wireless communication may include radio frequency identification (RFID), Bluetooth, wireless fidelity (WIFI), and wireless broadband (WiBro), etc.

The beam projector 130 receives various control information, i.e., a parameter for adjusting images from the remote controller 110, adjusts the input image using the received parameter, and outputs it to the screen. The beam projector 130 may be configured to include an RF transceiver 131, an image signal input unit 132, a pattern generator 133, a parameter extractor 134, an image adjustment unit 135, and an image signal output unit 138, etc.

The RF transceiver 131 may receive a request for the image adjustment function depending on the button or menu of the user according to the remote controller 110 or transmit and receive various control information, etc., for adjusting the image, generated according to the execution of the image adjustment function, through the wireless communication.

(1) when the image adjustment function is requested through the RF transceiver 131, the pattern generator 133 first generates the first test image for adjusting colors and outputs the generated first test image. The pattern generator 133 generates the second test image for adjusting the geometrical shape and outputs the generated second test image.

(2) when various control information is received through the RF transceiver 131, the parameter extractor 134 extracts the parameters, that is, the first parameter, the second parameter, etc., from the received various control information.

The image signal input unit 132 receives the image signal and the image adjustment unit 135 adjusts the colors and the geometrical shape of the input image signal, etc., by using the first parameter and the second parameter extracted from the parameter extractor 134.

The image signal output unit 138 projects the adjusted image on the screen 140.

Figure 4:
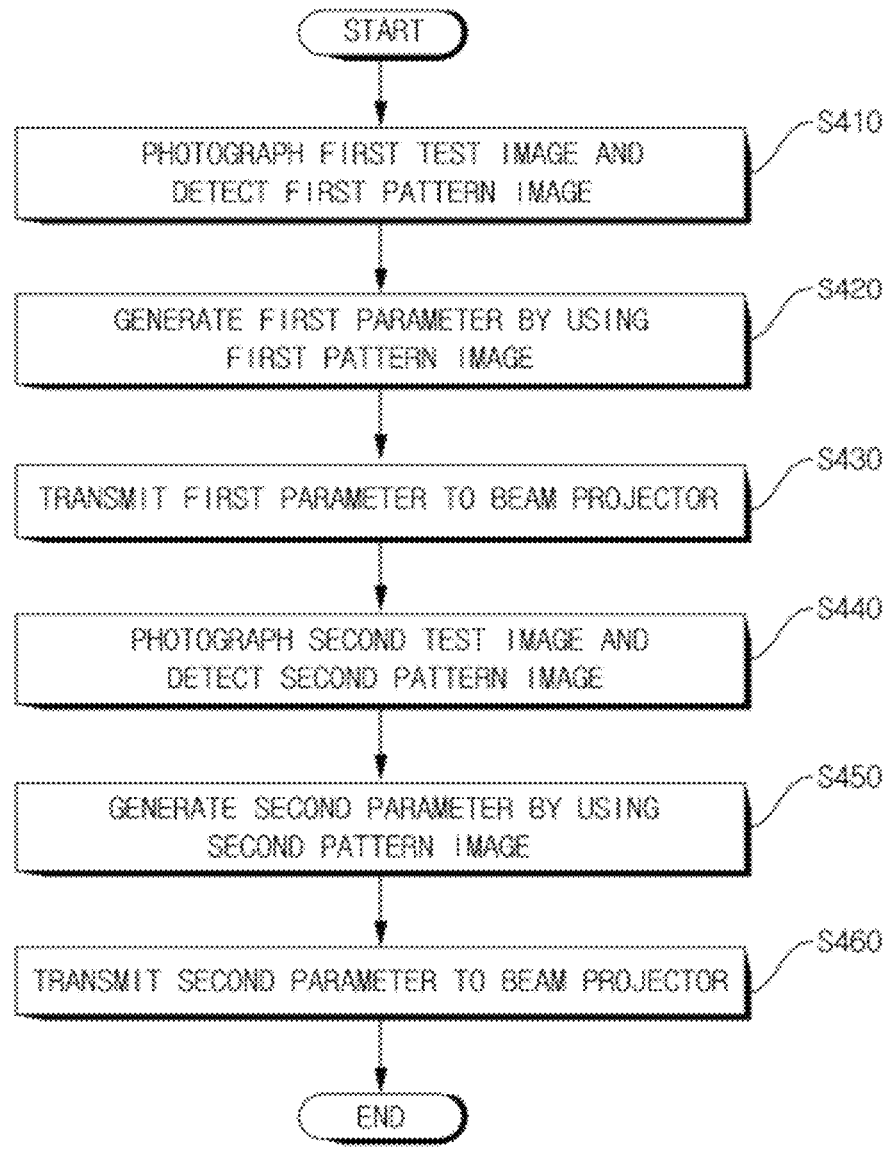
FIG. 4 is an exemplified diagram showing a method for adjusting an image in a remote controller 110 shown in FIG. 1.

FIG. 4 is an exemplified diagram showing the method for adjusting the image in the remote controller 110 shown in FIG. 1.

As shown in FIG. 4, when the image adjustment function is executed according to the operation of the user according to the present invention, the remote controller 110 requests the first test image for adjusting images to the beam projector 130.

When the first test image is projected on the screen from the beam projector 130, the remote controller 110 photographs the projected first test image and detects the first pattern image from the photographed first test image (S410). In this case, when the remote controller 110 does not detect the first pattern image for a predetermined time, it repeatedly performs the detection of the first pattern image by a predetermined number of times or more.

Although the remote controller 110 repeatedly performed the detection of the first pattern image by a predetermined number of times or more, when it does not detect the first pattern image, it is determined as an error generation and again requests the first test image to the beam projector 130.

The remote controller 110 generates the first parameter for adjusting the color of the projected image by using the detected first pattern image (S420) and transmits the generated first parameter to the beam projector 130 (S430).

Thereafter, when the beam projector 130 projects the second test image on the screen, the remote controller 110 photographs the projected second test image and detects the second pattern image from the photographed second test image (S440). In this case, when the remote controller 110 does not detect the second pattern image for a predetermined time, it repeatedly performs the detection of the second pattern image by a predetermined number of times or more.

Although the remote controller 110 repeatedly performed the detection of the second pattern image by a predetermined number of times or more, when it does not detect the second pattern image, it is determined as an error generation and again requests the second test image to the beam projector 130.

The remote controller 110 generates the second parameter for adjusting the geometrical shape of the projected image by using the detected second pattern image (S450) and transmits the generated second parameter to the beam projector 130 (S460).

Figure 5:
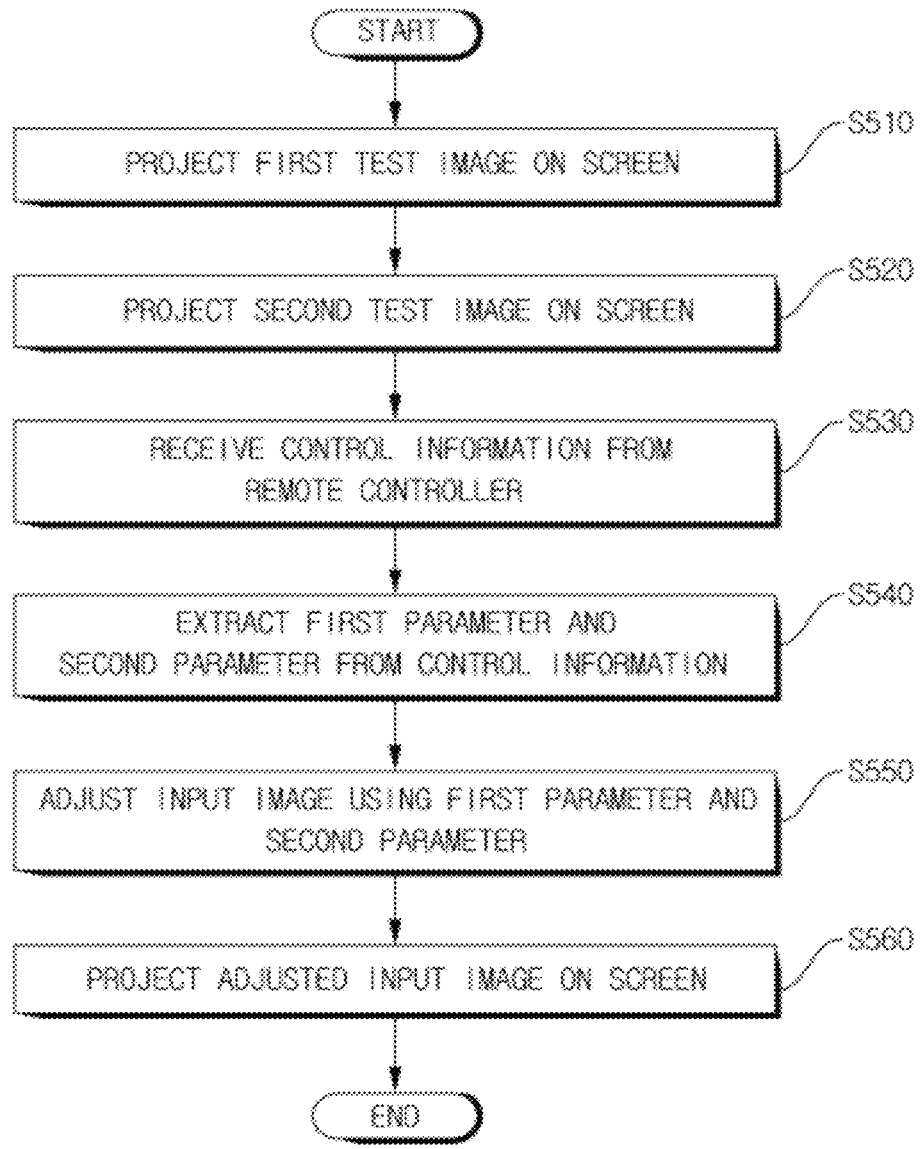
FIG. 5 is an exemplified diagram showing a method for adjusting an image of a beam projector 130 shown in FIG. 1.

FIG. 5 is an exemplified diagram showing a method for adjusting an image of a beam projector 130 shown in FIG. 1.

As shown in FIG. 5, in a case where the image adjustment function is executed according to the operation of the user according to the present invention, when the beam projector 130 receives a request for the first test image for adjusting an image from the remote controller 110, it projects the first test image on the screen for a predetermined time (S510).

When the beam projector 130 receives a request for the second test image for adjusting an image from the remote controller 110, it projects the second test image to the screen for a predetermined time (S520).

Next, when the beam projector 130 receives various control information from the remote controller (S530), it extracts the first parameter and the second parameter from the received various control information (S540).

The beam projector 130 adjusts the color and the geometrical shapes of the input image signal by using the extracted first parameter and second parameter (S550) and projects the adjusted image signal on the screen (S560).

Figure 6:
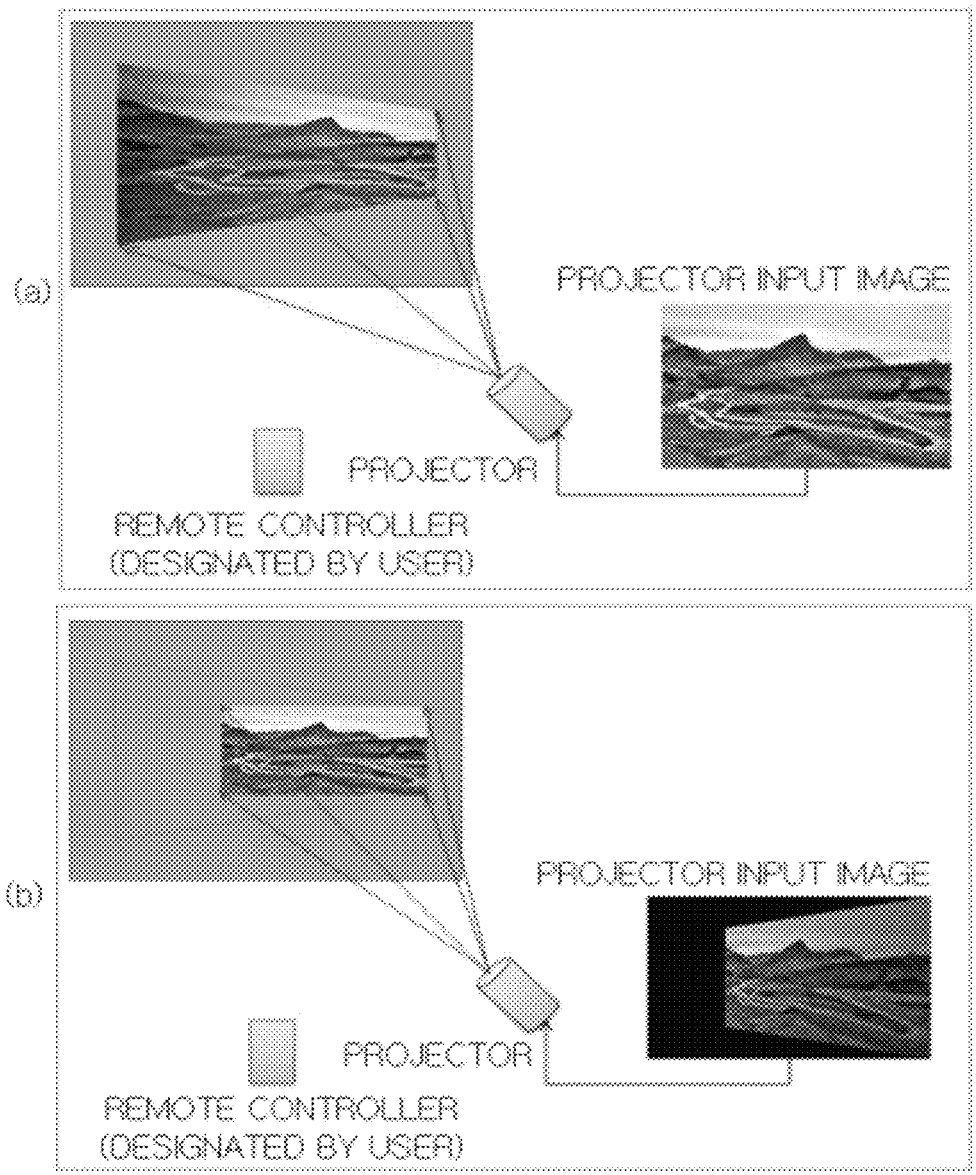
FIG. 6 is an exemplified diagram showing an image before and after adjustment according to the exemplary embodiment of the present invention.

FIG. 6 is an exemplified diagram showing an image before and after adjustment according to the exemplary embodiment of the present invention.

As shown in FIG. 6, the system for adjusting an image according to the present invention may distort the geometrical shape of the image projected on the screen according to the position and irradiated angle of the beam projector event though the normal image are inputted like (a).

When the image in which the distortion of the geometrical shape is adjusted is inputted by using the camera mounted on the remote controller similar to (b), it is possible to adjust the geometrical distortion of the image projected on the screen.

A series of devices adjusting an image by being associated with the remote controller are included in the projector, but a separate device adjusting only the image signal is implemented below. The present invention is not necessarily limited to the exemplary embodiment and may be implemented in various shapes.

FIG. 7 is a second exemplified diagram showing a system for adjusting an image of a beam projector according to the exemplary embodiment of the present invention.

As shown in FIG. 7, a system for adjusting an image of a beam projector according to the present invention may be configured to include a remote controller 110, an image transducer 120, a beam projector 130, a screen 140, or the like.

The remote controller 110 photographs images projected on a screen using a camera and extracts specific patterns from the photographed images and generates information necessary to adjust images through the extracted specific patterns. The remote controller 110 may be configured to include a user interface 111, a camera 112, a pattern detector 113, a parameter generator 114, an RF transceiver 115, or the like.

The configuration and function of the remote controller 110 is the same as the contents described in FIG. 1, and therefore, the description thereof will be omitted.

The image transducer 120 serves to adjust the image signal and is configured separately from the beam projector and may be configured to include an RF transceiver 121, an image signal input unit 122, a pattern generator 123, a parameter extractor 124, an image adjustment unit 125, an image signal transmitter 126, or the like.

The RF transceiver 121 may receive a request for the image adjustment function depending on the button or menu selection of the user according to the remote controller 110 or transmit and receive various control information, etc., for adjusting the image, generated according to the execution of the image adjustment function, through the wireless communication.

(1) when the image adjustment function is requested through the RF transceiver 121, the pattern generator 123 first generates the first test image for adjusting colors and transmits the generated first test image to the beam projector through the image signal transmitter 126. Then, the pattern generator 123 generates the second test image for adjusting the geometrical shape and transmits the generated second test image to the beam projector through the image signal transmitter 126.

(2) when various control information is received through the RF transceiver 121, the parameter extractor 124 extracts the parameter, that is, the first parameter, the second parameter, etc., from the received various control information.

The image signal input unit 122 receives the image signal and the image adjustment unit 125 adjusts the colors and the geometrical shape of the input image signal, etc., by using the first parameter and the second parameter extracted from the parameter extractor 124. The image signal transmitter 126 transmits the adjusted image signal to the beam projector.

The beam projector 130 projects the image signal received from the image transducer 120 on the screen and may be configured to include an image signal receiver 137, an image signal output unit 138, etc. That is, the image signal receiver 137 receives the image signal from the image transducer 120 and the image signal output unit 138 projects the received image signal on the screen 140.

That is, the beam projector 130 according to the present invention does not perform the function of adjusting an image and projects only the image adjusted through the image transducer 120 on the screen 140.

As set forth above, the present invention can adjust the distortions of colors and geometrical shapes of the image at the user's view point and improve the satisfaction due to the image adjustment at the user's viewpoint by photographing the test images projected on the screen using the camera attached remote controller to extract the specific pattern images and generating the control information necessary for adjusting the images through the extracted pattern images.

Further, the present invention can implement the system in various shapes by photographing the test images projected on the screen using the camera attached remote controller to extract the specific pattern images and generating the control information necessary for adjusting the images through the extracted pattern images.

The a system for adjusting images of a beam projector using a camera attached remote controller and a method thereof according to the present invention can be variously changed and modified by those skilled in the art without departing from the scope of the present invention. The spirit of the present invention has been just exemplified. It will be appreciated by those skilled in the art that various modifications, changes, and substitutions can be made without departing from the essential characteristics of the present invention. Accordingly, the embodiments disclosed in the present invention and the accompanying drawings are used not to limit but to describe the spirit of the present invention. The scope of the present invention is not limited only to the embodiments and the accompanying drawings. The protection scope of the present invention must be analyzed by the appended claims and it should be analyzed that all spirits within a scope equivalent thereto are included in the appended claims of the present invention.

What is claimed is:

1. A system for adjusting images of a beam projector, comprising:
    a remote controller photographing test images projected on a screen and detecting pattern images from the photographed test images and generating control information including at least one parameter necessary to adjust the images through the detected pattern images; and
    a beam projector receiving the control information for adjusting images from the remote controller and adjusting the input image by using parameters included in the received control information and outputting them to the screen,
    wherein the remote controller is spaced apart from the beam projector such that the remote controller and the beam projector have different view points relative to the screen.

2. The system for adjusting images of a beam projector according to claim 1, wherein the remote controller includes:
    a camera mounted at a predetermined position and photographing the test images projected on the screen;
    a pattern detector detecting pattern images from the photographed test images;
    a parameter generator generating at least one parameter for adjusting images from the detected pattern images; and
    an RF transceiver transmitting the control information including the generated parameters to the beam projector.

3. The system for adjusting images of a beam projector according to claim 1, wherein the remote controller photographs the first test images projected on the screen and detects the first pattern image from the photographed first test image and generates the first parameter for adjusting the colors of the input image through the detected first pattern image, and photographs the second test images projected on the screen and detects the second pattern image from the photographed second test image and generates the second parameter for adjusting the geometrical shapes of the input image through the detected second pattern image.

4. The system for adjusting images of a beam projector according to claim 3, wherein the first test image represents the images covered with white and the first pattern image represents the images photographed to confirm the white balance and the color uniformity of the first test image.

5. The system for adjusting images of a beam projector according to claim 3, wherein the second test image represents the image including the predetermined shape of blocks and the second pattern image represents the images photographed to confirm the geometrical shapes of the second test image.

6. The system for adjusting images of a beam projector according to claim 1, wherein the beam projector includes:
    an RF transceiver receiving the control information from the remote controller;
    a parameter extractor extracting at least one parameter included in the received control information;
    an image adjustment unit adjusting the input image by using the extracted parameters; and
    an image signal output unit outputting the adjusted input image to the screen.

7. The system for adjusting images of a beam projector according to claim 6, wherein the beam projector further includes a pattern generator generating the test images when the image adjustment function is performed according to the request of the user.

8. A system for adjusting an image of a beam projector, comprising:
    a remote controller photographing test images projected on a screen and detecting pattern images from the photographed test images and generating control information including at least one parameter necessary to adjust the images through the detected pattern images; and
    an image transducer receiving the control information for adjusting images from the remote controller and adjusting the input image by using parameters included in the received control information; and
    a beam projector receiving the input images adjusted from the image transducer and outputting the adjusted input images to the screen,
    wherein the remote controller is spaced apart from the beam projector such that the remote controller and the beam projector have different view points relative to the screen.

9. The system for adjusting an image of a beam projector of claim 8, wherein the image transducer includes:
    an RF transceiver receiving the control information from the remote controller;
    a parameter extractor extracting at least one parameter included in the received control information;
    an image adjustment unit adjusting the input image by using the extracted parameters; and
    an image signal transmitter transmitting the adjusted input image to the beam projector.

10. The system for adjusting an image of a beam projector of claim 8, wherein the beam projector includes:
    an image signal receiver receiving the input images adjusted from the image transducer; and
    an image signal output unit outputting the adjusted input image to the screen.

11. A method for adjusting an image of a beam projector in a camera attached remote controller capable of controlling various functions of a beam projector, comprising:
    photographing test images projected on the screen and detecting pattern images from the photographed test images;
    generating control information including at least one parameter necessary to adjust images through the detected pattern images; and
    transmitting the generated control information to the beam projector,
    wherein the remote controller is spaced apart from the beam projector such that the remote controller and the beam projector have different view points relative to the screen.

12. The method for adjusting an image of a beam projector of claim 11, wherein the photographing includes:
    photographing a first test image projected on the screen and detecting a first pattern image from the photographed first test image; and
    photographing a second test image projected on the screen and detecting a second pattern image from the photographed second test image.

13. The method for adjusting an image of a beam projector of claim 12, wherein the generating includes:
    generating a first parameter for adjusting colors of the input image through the detected first pattern image; and
    generating a second parameter for adjusting the geometrical shape of the input image through the detected second pattern image.

14. The method for adjusting an image of a beam projector of claim 12, wherein the first test image represents the images covered with white and the first pattern image represents the images photographed to confirm the white balance and the color uniformity of the first test image.

15. The method for adjusting an image of a beam projector of claim 12, wherein the second test image represents the image including the predetermined shape of blocks and the second pattern image represents the images photographed to confirm the geometrical shapes of the second test image.

16. A method for adjusting images in a beam projector requested to perform an image adjustment function from a camera attached remote controller, comprising:
   receiving control information from the remote controller;
   extracting at least one parameter included in the received control information;
   adjusting the input images using at least one of the extracted parameters; and
   projecting the adjusted input images on the screen,
   wherein the remote controller is spaced apart from the beam projector such that the remote controller and the beam projector have different view points relative to the screen.

17. The method for adjusting images in a beam projector of claim 16, further comprising:
   generating test images when the image adjustment function is performed according to the request of the user; and
   projecting the generated test images on the screen.

* * * * *